(12) United States Patent
Bhatt

(10) Patent No.: US 9,460,199 B2
(45) Date of Patent: Oct. 4, 2016

(54) APPLICATION OF TEXT ANALYTICS TO DETERMINE PROVENANCE OF AN OBJECT

(71) Applicant: International Business Machines Corporation, Armonk, NY (US)

(72) Inventor: Dhruv A. Bhatt, Indian Trail, NC (US)

(73) Assignee: International Business Machines Corporation, Armonk, NY (US)

( * ) Notice: Subject to any disclaimer, the term of this patent is extended or adjusted under 35 U.S.C. 154(b) by 402 days.

(21) Appl. No.: 13/874,520

(22) Filed: May 1, 2013

(65) Prior Publication Data
US 2014/0330792 A1 Nov. 6, 2014

(51) Int. Cl.
G06F 17/30 (2006.01)
(52) U.S. Cl.
CPC .................. *G06F 17/30707* (2013.01)
(58) Field of Classification Search
None
See application file for complete search history.

(56) References Cited

U.S. PATENT DOCUMENTS

| | | | |
|---|---|---|---|
| 7,120,586 B2 | 10/2006 | Loui et al. | |
| 7,912,705 B2 | 3/2011 | Wasson et al. | |
| 7,971,179 B2 | 6/2011 | Venolia | |
| 8,229,775 B2 | 7/2012 | Adler et al. | |
| 8,356,248 B1* | 1/2013 | Killalea | 715/273 |
| 2009/0327115 A1 | 12/2009 | Schilder et al. | |
| 2011/0162086 A1* | 6/2011 | Rogel | G06F 21/10 726/28 |
| 2012/0078503 A1 | 3/2012 | Dzubay et al. | |

OTHER PUBLICATIONS

Reynolds, "An Art Provenance Research Guide for the Researcher and Librarian: a List of Resources," A Master's paper, School of Information and Library Science, University of North Carolina at Chapel Hill, Chapel Hill, North Carolina, Apr. 2008.*
Liz F. Kay, "Work to resume on trail to Howard Co.", Baltimore Sun, Apr. 29, 2003.*

* cited by examiner

*Primary Examiner* — Jay Morrison
(74) *Attorney, Agent, or Firm* — Isaac J. Gooshaw; Olivia R. Scheuer

(57) ABSTRACT

A computer identifies a first source of information that includes unstructured text and one or more keywords associated with an object. The computer retrieves the unstructured text included in the first source. The computer identifies provenance information of the object that is included in one or more segments of the unstructured text. The computer adds the identified provenance information of the object to a timeline.

20 Claims, 3 Drawing Sheets

APPLICATION OF TEXT ANALYTICS TO DETERMINE PROVENANCE OF AN OBJECT

FIELD OF THE INVENTION

The present invention relates generally to the field of determining provenance, and more particularly to the generation of a provenance timeline using captured provenance information.

BACKGROUND OF THE INVENTION

A primary purpose of tracing the provenance of an object or entity is to provide contextual and circumstantial evidence for its original production or discovery and history thereafter. Provenance is created by establishing, as far as practicable, the history of an object or entity. In particular, provenance typically includes the sequences of formal ownership, custody, and places of storage for a given object or entity. The practice of tracking provenance has a particular value in the authentication of objects. Comparative techniques, expert opinions, and the results of scientific tests may also be used to aid in authentication, but establishing provenance is essentially a matter of documentation.

SUMMARY

Embodiments of the present invention disclose a method, computer program product, and system for generating a provenance for an object. A computer identifies a first source of information that includes unstructured text and one or more keywords associated with an object. The computer retrieves the unstructured text included in the first source. The computer identifies provenance information of the object that is included in one or more segments of the unstructured text. The computer adds the identified provenance information of the object to a timeline.

DETAILED DESCRIPTION

Figure 1:
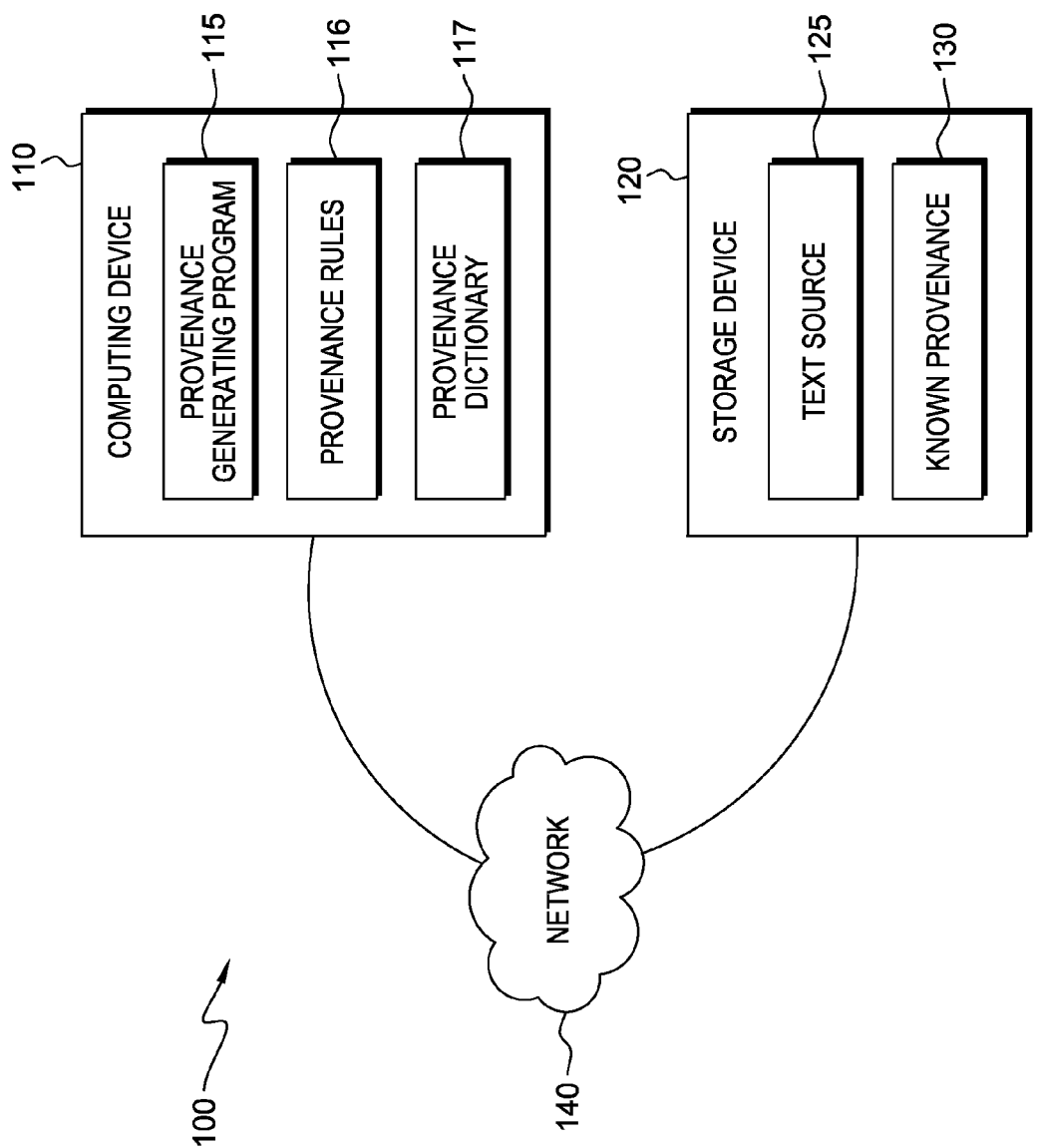
FIG. 1 is a functional block diagram illustrating a provenance determining environment, in accordance with an exemplary embodiment of the present invention.

The objective of provenance research is to produce a complete list of owners (together, where possible, with the supporting documented proof). For example, a complete provenance search would include the owners of a painting from the time when the painting was commissioned or created in the artist's studio, to the present time. In practice, there are likely to be gaps in the list of owners and documents can be missing or lost. Provenance information can help provide details about a given object, e.g., to assign a given artwork to a known artist. When possible, documented provenance should also list other information, for example, when the painting has been part of an exhibition and a bibliography of when it has been discussed (or illustrated) in print. The provenance of an object may vary greatly in length. Depending on context or the amount of information that is known, the length of provenance can very from a single name entry in a scholarly catalogue to a document that is thousands of words long.

Many art galleries exercise a great deal of effort into researching the provenance of paintings in their collections. Auction records, often include documentation that can assist in researching the provenance of paintings. Documented evidence of provenance for an object can help to establish that the object has not been altered and is not a forgery, a reproduction, or stolen art. For example, an auction record can be used to verify that a particular artwork was purchased by an individual who later wishes to sell that artwork. In another example, provenance may confirm whether an object is genuinely of the period the object appears to date from.

The quality of provenance of an important work of art can make a considerable difference to its selling price in the market. The selling price is often affected by the degree of certainty of the provenance, the status of past owners as collectors, and by the strength of evidence that an object has not been illegally excavated or exported from another country. A good provenance can increase the value of an object, for example, a painting, and establishing provenance may help confirm the date, artist, and the subject of a painting, especially for portraits. The provenance of an object can also help resolve ownership disputes. For example, the documented provenance of a painting from between the years of 1813 to 1855 is used to determine that a painting disappeared from an art collection. As a result, the painting is returned to the true owner. In some cases, the value of an object, e.g., an antiquity or a work of art, can be modified according to a degree of reliability for the provenance of the object. For example, a provenance supplied by the owner of a painting has a forty five percent correspondence with a known provenance for the painting. As a result, the selling price of the painting is reduced by thirty percent, since there is an increased risk of the buyer purchasing a forgery.

An expert certification in a provenance can mean the difference between an object having no value or being worth a fortune. However, certifications themselves may be open to question. In the past, many forged pieces of art have been passed off as being genuine, using falsified certifications, including falsified certifications accepted by galleries and dealers as genuine artworks. Some forgers have even gone to the extent of forging other types of supporting documents, e.g., letters and false entries in exhibition catalogues, to add additional credibility to the authenticity of an object. Often, a provenance known to be detailed and well documented, can make identification of falsified documentation easier to identify by comparing the two sets of information. However, this often requires that the known provenance contains as few gaps as possible. To fill in gaps in provenance, it is often useful to work backwards from a known provenance starting point.

When provenance research is proceeding backwards, e.g., when filling in a gap in a known provenance, all the discovered facts are typically recorded. For example, the physical details of an object, e.g., style, subject, signature, materials, dimensions, frame, etc., are added to the provenance. In general, the more details that a provenance contains the more accurate and trustworthy that provenance becomes. Often the recorded details of a given object can change over time. For example, the titles of paintings and the attribution to a particular artist may change over time. However, using the size of the work and its description, earlier references to the painting can be identified.

Often, provenance information can be found on an object itself. For example, the back of a painting can contain significant provenance information. There may be, for example, exhibition marks, dealer stamps, gallery labels and other indications of previous ownership. There may also be shipping labels. Early provenance can sometimes be indicated by a cartellino that is added to a painting in a collection. A cartellino is a small piece of paper, which is often attached to artwork and typically includes important information about the artist and subject of a painting. A cartellino is often painted as though it is attached to a wall or parapet in a painting. The difficulty with a cartellino stems from the fact that a cartellino can be forged, can become faded, or can be painted over. Therefore, a cartellino may only be of limited value when determining the provenance of an object.

The use of provenance is not limited to works of art. Many other objects often have detailed provenance. For example, in transactions of old wine with the potential of improving with age, the issue of provenance has a large bearing on the assessment of the contents of a bottle, both in terms of quality and the risk of wine fraud. Due to the fragile nature of wine, a documented history of wine cellar conditions can be invaluable when estimating the quality and worth of an older vintage. Based on a given provenance, the value of a particular bottle of wine can be greatly increased or decreased.

Provenance is also a fundamental principle of archival science, i.e., referring to the individual, group, or organization that originally created or received the items in a collection, and to the items' subsequent chain of custody. According to archival theory and the principle of provenance, records of different provenance should be separated. For example, the records from two different sources would not be combined into one source, even if they cover the same topic. Conversely, records that originate from a common source should be kept together—preferably physically, but, where that is not practicable, certainly intellectually in the way in which they are catalogued and arranged in finding aids—in accordance with what is sometimes termed the principle of archival integrity. In archival practice, proof of provenance is provided by the documented history of the records kept in the archives, including details of amendments made to the records. The reliability of a set of records is considered to be severely compromised if the provenance of the records is uncertain, for example, if there are gaps in the recorded chain of custody of the records. In general, the inclusion of records with uncertain provenance adds little to the overall reliability of the provenance of an object. In other words, the reliability of a provenance for an object is directly related to the reliability of the records that were used to create that provenance.

In the case of written works, such as books, the study of provenance refers to the study of the ownership of individual copies of a given written work. Provenance is usually extended in definition, for written works, to include the study of the circumstances in which individual copies of written works have changed ownership, and of evidence left in books that shows how readers interacted with them. Such provenance can provide information about the written works themselves, for example, providing evidence of the role particular written works have played in social, intellectual and literary history. Such provenance may also add to our knowledge of the particular owners of a given written work. For example looking at the books owned by a politician may help to show which written works influenced their political decisions.

Provenance can be of importance in archaeology. Fake artifacts are not unknown and archeological finds are sometimes removed from the context in which they were found without documentation, reducing their value to the world of learning. The provenance of a find may not be properly represented by the context in which it was found. Artifacts can be moved far from their place of origin by mechanisms that include looting, collecting, theft or trade and further research is often required to establish the true provenance of a find.

In archaeology (particularly North American archaeology and anthropological archaeology throughout the world), the term provenience is used in related but a subtly different sense to provenance. Archaeological researchers use provenience to refer to the three-dimensional location of an artifact or feature within an archaeological site, whereas provenance covers an object's complete documented history. Provenience can be used more broadly (e.g. the name of a village or area), especially when an artifact was found by a private party and its specific position not recorded. Any given antiquity may therefore have both a provenience (where it was found) and a provenance (where it has been since it was found). Therefore, a documented provenance of an object can include provenience information. In some cases, e.g. known artisanship or original ownership, the provenance of an antiquity may include facts that predate the entry of the antiquity into the archaeological record, as well as facts relating to a history of the antiquity after rediscovery.

With the advent of the computer age, information is increasingly available to a wider range of individuals. While this information can be helpful in assembling the provenance of a given object, the same information can just as easily be used to forge false documentation. Such false documentation would appear to be accurate and authentic on many levels because the documents themselves are based on known facts. Therefore, the assembly of a highly detailed authentic provenance is increasingly valuable, as is the ability to verify the purported provenance of an object.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. While exemplary embodiments and examples often refer to an object as being tangible or physical in nature, this is not to be interpreted as a limitation. An object is herein defined as the subject for which provenance is to be determined and can include non-tangible entities such as, for example, computer programs stored on tangible persistent storage devices. FIG. 1 is a functional block diagram illustrating a provenance determining environment, generally designated 100, in accordance with one embodiment of the present invention. Provenance determining environment 100 includes computing device 110 and storage device 120 connected through a network 140. Computing device 110 includes provenance generating program 115, provenance rules 116, and provenance dictionary 117.

In various embodiments of the present invention, storage device 120 is a data storage device in communication with computing device 110. Storage device 120 includes text source 125 and known provenance 130. Typically, the information included in text source 125 and known provenance 130 is accessed as needed by computing device 110 via network 140. In some embodiments, storage device 120 is integral with computing device 110.

In various embodiments of the present invention, computing device 110 is a computing device that can be a standalone device, such as a server, a laptop computer, a tablet computer, a netbook computer, a personal computer (PC), a smartphone, or a desktop computer. In another embodiment, computing device 110 represents a computing system utilizing clustered computers and components to act as a single pool of seamless resources. In general, computing device 110 can be any computing device or a combination of devices capable of running provenance generating program 115, and has access to provenance generating program 115, provenance rules 116, provenance dictionary 117, text source 125, and known provenance 130. Computing device 110 may include internal and external hardware components, as depicted and described in further detail with respect to FIG. 3.

In this exemplary embodiment, provenance generating program 115, provenance rules 116, and provenance dictionary 117 are stored on computing device 110. However, in other embodiments, provenance generating program 115, provenance rules 116, and provenance dictionary 117 may be stored externally and accessed through a communication network, such as network 140. Network 140 can be, for example, a local area network (LAN), a wide area network (WAN) such as the Internet, or a combination of the two, and may include wired, wireless, fiber optic or any other connection known in the art. In general, network 140 can be any combination of connections and protocols that will support communications between computing device 110 and storage device 120 in accordance with an exemplary embodiment of the present invention.

In general, provenance generating program 115 uses analysis rules and an object location and relationship dictionary to search for, retrieve, and analyze unstructured text that relates to an object. Provenance generating program 115 uses the analyzed text to generate a timeline reflecting the provenance of a given object. In an exemplary embodiment, the analysis rules and the object location and relationship dictionary used by provenance generating program 115 are included in provenance rules 116 and provenance dictionary 117, respectively. The unstructured text that provenance generating program 115 uses is included in text source 125, of storage device 120.

In exemplary embodiments, provenance rules 116 include a set of rules used to parse text samples, e.g., unstructured text included in text source 125. In general, there are many possible rules which can be applied to text analysis to identify relevant pieces of information, e.g., names, dates and activities that provide provenance information. Broadly speaking, there are currently three different fields that depend on the processing of natural language, namely, information retrieval, information extraction and natural language parsing. The rules included in provenance rules 116 include rules for information retrieval, information extraction and natural language parsing. In some embodiments, provenance rules 116 can include other rules to control the way in which provenance generating program 115 processes information, as well as what information to include in a provenance timeline. For example, provenance rules 116 can include a rule that causes provenance generating program 115 to calculate an accuracy for a given piece of provenance information and include that information in a provenance timeline, e.g., indicate on the provenance timeline how likely the provenance information is accurate.

In exemplary embodiments, the rules regarding information retrieval include rules for performing searches as well as retrieving specific items from, for example, a database, based on a text query. For example, keywords associated with peer reviewed papers can be used to retrieve those peer reviewed papers when a user initiates a query using those keywords. Text associated with an image can be used to retrieve the source of the text. For example, an art museum notation of a painting can be used to retrieve a full description of the artwork.

In exemplary embodiments, the rules regarding information extraction include rules to extract pre-determined information from a text. Information extraction can be generally defined as the activity of populating a structured information repository using an unstructured, or free text, information source. The rules regarding information extraction can include rules for text analysis, data mining, summarization and indexing. In general, provenance generating program 115 applies the information extraction rules, included in provenance rules 116, to extract provenance related information from text sources.

In general, in exemplary embodiments, both information retrieval and information extraction based rules are minimal-processing approaches in that they use only parts of the input text, and ignore any other structure or components that may be involved. In exemplary embodiments, the rules regarding natural language parsing involve a detailed analysis of a piece of text or segment of speech to uncover the structure and meaning of its parts, typically, to relate the piece of text or segment of speech to other parts of a larger discourse. Natural language parsers include linguistically-motivated rule-based parsers and statistical parsers. Partial parsers are capable of analyzing the syntactic structure of selected parts of input texts.

In general, provenance generating program 115 applies the natural language parsing rules to identify parent sources of an identified text segment. For example, a text segment is an abstract of a larger volume of text. Provenance generating program 115 applies the natural language parsing rules and identifies that the text segment originates from a larger source. Provenance generating program 115 then retrieves the full text of the larger source and extracts provenance related information from larger source. In exemplary embodiments, provenance rules 116 includes a set of rules to identify proper nouns. Provenance generating program 115 compares identified proper nouns to a list of words included in provenance dictionary 117. If the identified proper noun is not included in provenance dictionary 117, then provenance generating program 115 updates provenance dictionary 117 to include the identified proper noun.

In exemplary embodiments, provenance dictionary 117 includes a set of words and phrases, e.g., keywords and key phrases, that indicate the relationship of the object to a given location, and a set of words that indicate the relationship of the object to a given time or time period. Words that indicate the relationship of the object to a given location can include words and phrases such as: attended, travelled to, visited, went, in, and moved to, as well as words indicating a destination or location such as city, and country. In general, words that indicate a relationship of the object to a given location include verbs, i.e., the words indicate movement, as well as location indicating words such as the proper names of cities, states, empires, countries, universities, and institutions etc.

In exemplary embodiments, words that indicate the relationship of the object to a given time or time period can include words such as: from, on, at, during, in, and to. In general, the words that indicate the relationship of the object to a given time or time period have a temporal, e.g., time-based definition and context. For example, a sample of text includes the phrase "Fred travelled to Europe in December 1978. During his stay, he attended a rock and roll concert on Apr. 2, 1979." The words and phrases included in provenance dictionary 117 would be used by provenance generating program 115 to identify the relationship of Fred (the object) "travelled to" Europe (the location) as well as the time relationship of December 1978 to Apr. 2, 1979, which defines the period Fred was known to have been in Europe.

In exemplary embodiments, storage device 120 includes text source 125. Text source 125 includes unstructured text that further includes a keyword or key phrase that relates the text to the object. Text source 125 can include unstructured text such as: digitized peer reviewed papers, electronic newspaper articles, as well as text included in websites. In general, text source 125 includes unstructured text that is accessible via in the Internet as well as unstructured text included in a storage device, such as a hard drive or a local computer network, which is accessible by computing device 110.

In exemplary embodiments, storage device 120 also includes known provenance 130. Known provenance 130 includes the provenance timeline(s) and results that are generated by provenance generating program 115. Known provenance 130 also includes the accepted or purported provenance of a given object. For example, a piece of art is being offered for sale and includes a documented provenance. If the documented provenance is being supplied by a private seller then the provenance may be considered as purported since the provenance has not been verified. However, if the documented provenance is being supplied by a well known art museum, i.e., the provenance has already been verified, then the provenance may be considered as accepted. In some exemplary embodiments, provenance generating program 115 can be used to add further details to a known documented provenance. For example, a documented provenance may include a time period where there is no documentation. Provenance generating program 115 could use the information included in the accepted documented provenance to search for provenance information for the time period with no documentation. In another example, provenance generating program 115 can be used to verify a purported provenance by comparing the purported provenance to a provenance timeline generated by provenance generating program 115. In some exemplary embodiments, after such a comparison, provenance generating program 115 can generate a report indicating the degree of accuracy, or overlap, between the purported provenance and the accepted provenance timeline.

Figure 2:
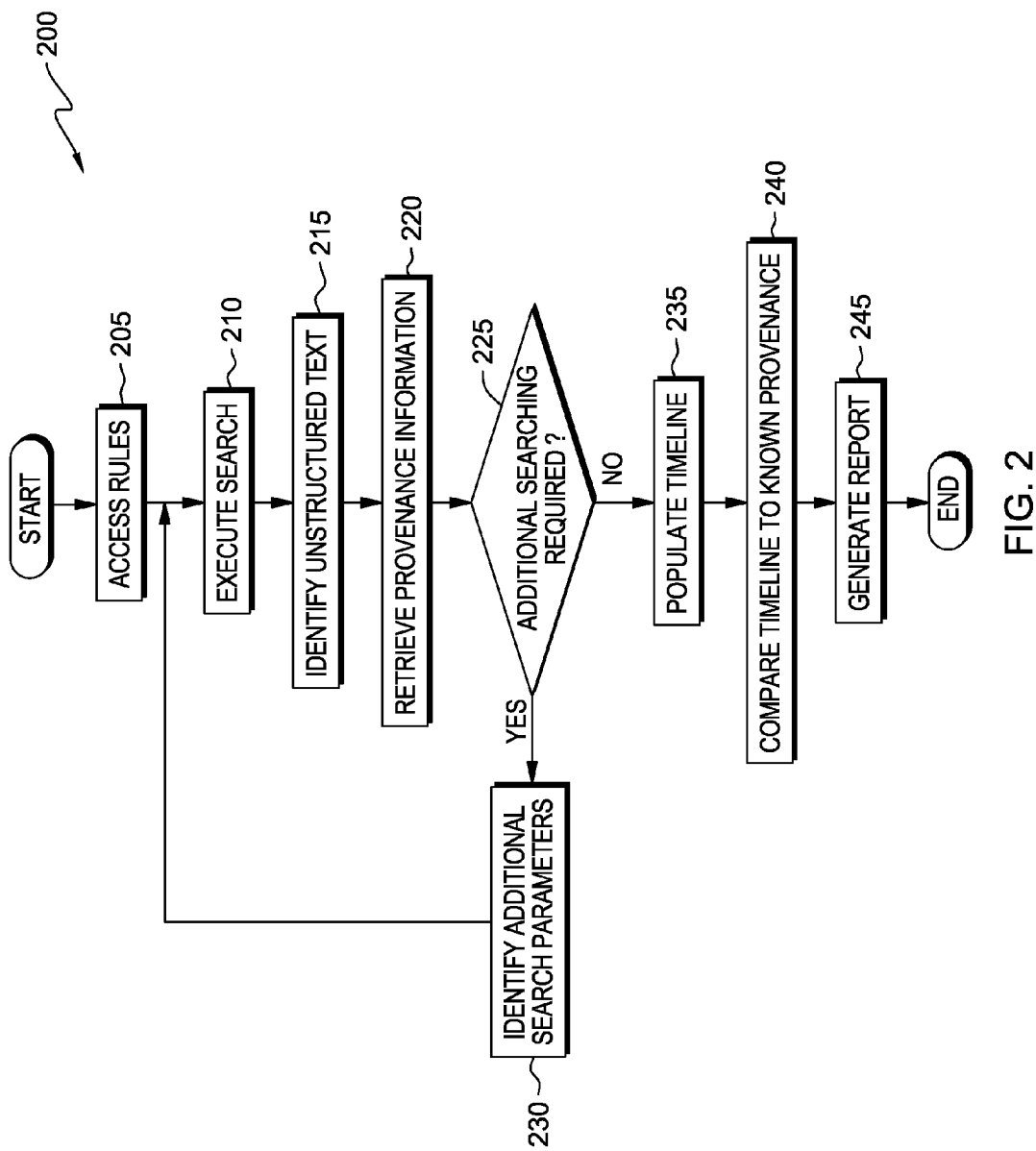
FIG. 2 is a flowchart illustrating operational steps of a provenance generating program, on a computing device within the provenance determining environment of FIG. 1, in accordance with an exemplary embodiment of the present invention.

FIG. 2 is a flowchart illustrating the operational steps of provenance generating program 115, in an exemplary embodiment.

In an exemplary embodiment, in step 205, provenance generating program 115 accesses provenance rules 116, specifically the rules regarding information retrieval, and identifies the keywords and/or key phrases that pertain to an object. Provenance generating program 115 then executes a search using the identified keywords and/or key phrases, in step 210. Information, namely unstructured text, returned by the search is stored as part of text source 125. In some embodiments, the search engine, used by provenance generating program 115 to execute searches, is integral to provenance generating program 115, i.e., is included as part of provenance generating program 115. In other exemplary embodiments, provenance generating program 115 works in conjunction with an existing search engine that is accessible by computing device 110.

In an exemplary embodiment, provenance generating program 115 identifies unstructured text, included in text source 125, which includes the keywords and/or key phrases that pertain to the object, in step 215. Provenance generating program 115, then applies the rules regarding information retrieval, included in provenance rules 116, and the information included in provenance dictionary 117 to retrieve provenance related information from the unstructured text, in step 220. For example, a search for the key phrase "manned moon landing" results in the identification and retrieval of information indicating the times, dates and locations (on the moon), of all the manned moon landings on record.

In an exemplary embodiment, in decision step 225, provenance generating program 115 determines if a search for additional details is needed. In general, the level of required detail, i.e., the extent of a search, is indicated by a user. In other embodiments, the level of required detail can be a preset value. In some embodiments, the level of additional detail required, such as facts regarding an event, can be defined by a time gap between identified provenance points. In still other embodiments, additional details can be required if there is a significant change in a detail of the object such as, for example, ownership. Some provenance events require larger amounts of facts regarding the event than other events. For example, a painting has a time gap of a year between two identified provenance points, and during that period the ownership of the painting changed. A change in ownership is considered an important detail for an object like a painting. Therefore, a rule, which is included in provenance rules 116, indicates that additional detail is required if a change in ownership occurs. As a result, depending on whether a significant change in a detail of an object is identified, provenance generating program 115 determines if additional searching for details, i.e., facts, is required.

In an exemplary embodiment, if additional searching is not required (decision step 225, no branch), then provenance generating program 115 proceeds to step 235. If additional searching is required (decision step 225, yes branch), then provenance generating program 115 uses the retrieved provenance related information to identify the parameters of the additional search, in step 230. Provenance generating program 115 then returns to step 210 and executes additional searches, using the parameters of the additional search, to identify additional details that were not previously identified in the keyword and/or key phrase searches. For example, an initial keyword and/or key phrase for provenance information for a painting yields the following: "August", "left England", "moved to", "North America", and "1912". An additional search using that provenance information yields the following: "boat", and "steamship". A final search for additional details yields, "U.S.S. Bonnie" "departed Aug. 12, 1912", and "arrived in port", "New York City", and "Sep. 3, 1912". In an exemplary embodiment, if a predetermined number of additional searches are not able to identify the required additional information then provenance generating program 115 determines that additional searching is not required (decision step 225, no branch) and proceeds to step 235.

Once the searches have been completed, in an exemplary embodiment, provenance generating program 115 applies the provenance information and additional details, e.g., facts, to populate a timeline, in step 235. For example, provenance generating program 115 first identifies the chronological information associated with each given piece of provenance information and additional detail, e.g., the date a given event occurred. Next, provenance generating program 115 matches the identified chronological information of each given piece of provenance information and additional detail to a corresponding chronological point on the timeline. Then provenance generating program 115 populates the timeline by associating each provenance information and additional detail with their corresponding chronological point on the timeline, e.g. if a painting was sold on Apr. 1, 1969, then the timeline would indicate the sale as occurring on Apr. 1, 1969.

In step 240, provenance generating program 115, compares the populated timeline information with accepted provenance information, included in known provenance 130, to identify any disagreements between the timeline information and the accepted provenance. For example, the populated timeline indicates that a painting was stolen from an art museum in 1883. However, the accepted provenance indicates that it was sold and purchased at that point in time. This is a clear disagreement in the provenance of the painting and is therefore identified as a difference by provenance generating program 115.

Finally, provenance generating program 115 generates a report, which is included in known provenance 130, including the generated provenance timeline and an indication of any identified differences, in step 245. For example, there are only a number of small disagreements, regarding additional details, between the generated provenance timeline and that of the accepted provenance. The number of, type of, and details of the disagreements between the generated provenance timeline and information is included in the report along with the generated provenance timeline. In some exemplary embodiments, the comparison of the generated provenance timeline and accepted provenance information is not present, and therefore is not included in the report.

In some alternative embodiments, an accuracy indicator, or a rating, for a given piece of provenance information is included in the timeline. The accuracy indicator can be, for example, based on a statistical analysis. The statistical analysis can be based on for example, the number of occurrences of a given piece of provenance information, or can take into account the source of the provenance information, e.g., a higher value can be given to information from a peer reviewed source as opposed to that of an internet chat site. For example, in one source a bottle of wine is listed as being sold to "wine collector A" on Apr. 3, 2002. However, three other sources only list the bottle being sold in the month of April, 2002. As such, the accuracy indicator of the provenance information would indicate a higher value for the month and year, but a lower value for the day.

Figure 3:
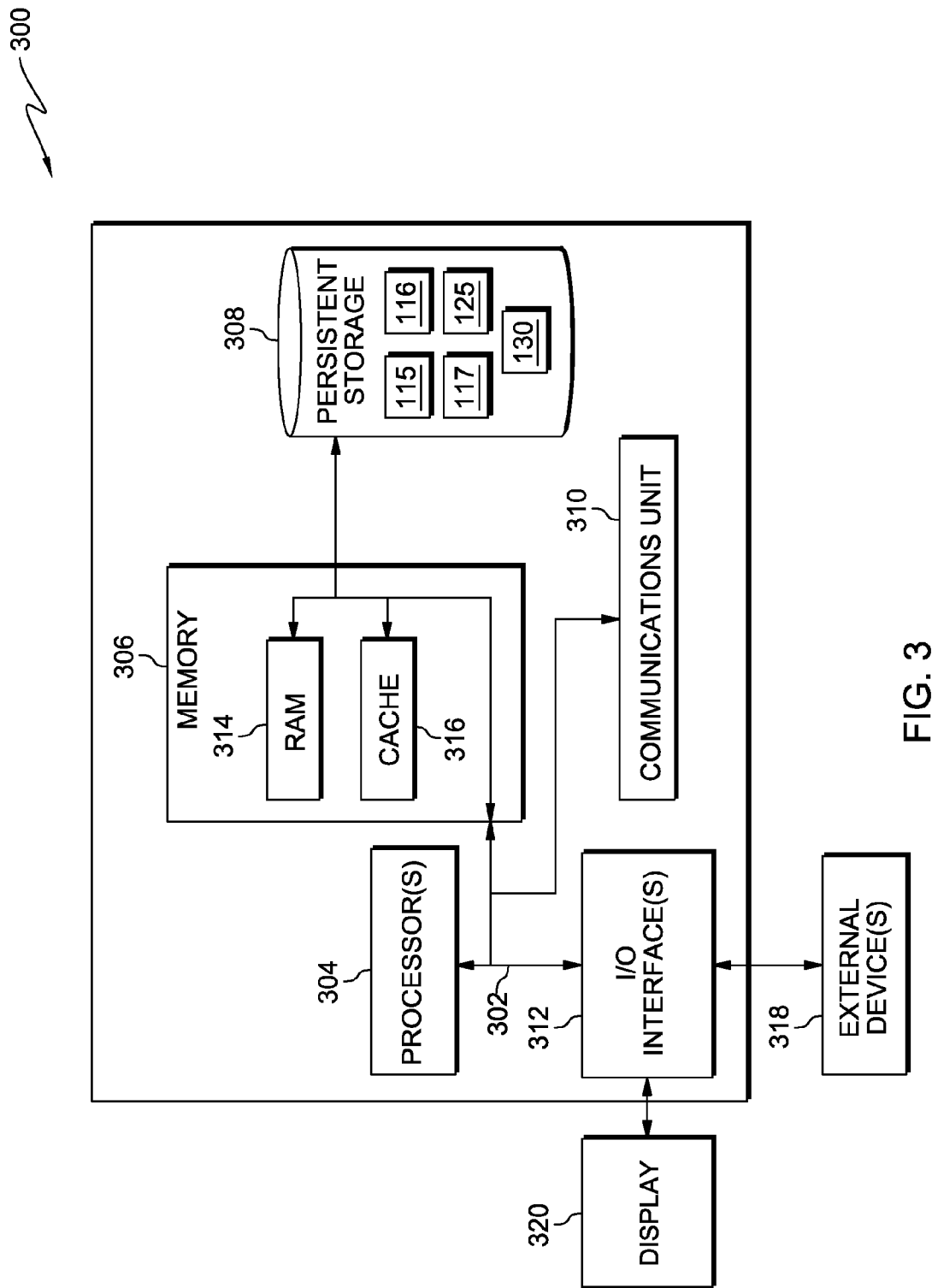
FIG. 3 depicts a block diagram of components of the computing device executing the provenance generating program, in accordance with an exemplary embodiment of the present invention.

FIG. 3 depicts a block diagram, 300, of components of computing device 110 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 110 includes a communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media.

Provenance generating program 115, provenance rules 116, provenance dictionary 117, text source 125, and known provenance 130 are stored in persistent storage 308 for execution and/or access by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including resources of storage device 120. In these examples, communications unit 310 includes one or more network interface cards. Communications unit 310 may provide communications through the use of either or both physical and wireless communications links. Provenance generating program 115, provenance rules 116, provenance dictionary 117, text source 125, and known provenance 130 may be downloaded to persistent storage 308 through communications unit 310.

I/O interface(s) 312 allows for input and output of data with other devices that may be connected to computing device 110. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., provenance generating program 115, provenance rules 116, provenance dictionary 117, text source 125, and known provenance 130, can be stored on such portable computer-readable storage media and can be loaded onto persistent storage 308 via I/O interface(s) 312. I/O interface(s) 312 also connect to a display 320.

Display 320 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for generating a provenance for a physical object, the method comprising:
   a computer identifying a first source of information that includes unstructured text and one or more keywords associated with an object;
   the computer retrieving the unstructured text included in the first source;
   the computer identifying provenance information of the object that is included in one or more segments of the unstructured text, wherein the identified provenance information is verified;
   the computer adding the identified provenance information of the object to a timeline;
   the computer receiving a purported provenance information;
   the computer determining a degree of accuracy of the purported provenance information using a statistical analysis based, at least in part, on a number of occurrences of the purported provenance information in the identified provenance information and a source of the purported provenance information, wherein the source of the purported provenance information comprises a historical context and one or more characteristics of a seller of the physical object; and in response to determining the degree of accuracy, the computer generating a report, wherein the report compares the purported provenance information to the identified provenance information, and wherein the report comprises (i) the degree of accuracy of the purported provenance information and (ii) an overlap between the purported provenance information and the identified provenance information.

2. The method of claim 1, wherein the provenance information includes at least one of a temporal characteristic, a location characteristic, an ownership characteristic, an action characteristic, or a fact about an event that affected the provenance of the object.

3. The method of claim 1, wherein the step of the computer identifying provenance information of the object that is included in one or more segments of the unstructured text includes the step of:

the computer performing text analytics on the unstructured text using a dictionary and a set of rules, wherein the set of rules includes rules to retrieve unstructured text, parse the retrieved text, and extract provenance information from the parsed text, and wherein the dictionary includes a set of keywords that indicate a relationship of an object to a location, and a set of words that indicates the relationship of an object to a time.

4. The method of claim 1, wherein the step of the computer adding the provenance information of the object to a timeline includes:

the computer determining a relationship between the provenance information and one or more information included in the timeline; and the computer adding the provenance information to the timeline based, at least in part, on the identified relationship between the provenance information and one or more information included in the timeline.

5. The method of claim 1, the method further including the steps of:

the computer searching for a second source of information based, at least in part, on a segment of the unstructured text included in the first source;

the computer retrieving information included in an identified second source;

the computer identifying a detail in the second source that relates to the provenance information included in the first source;

the computer determining a relationship between the provenance information and the detail; and the computer adding the detail to the timeline based, at least in part, on the identified relationship between the provenance information and the detail.

6. The method of claim 5, wherein the detail relating to the provenance information included in the first source includes a fact about an event that affected the provenance of the object.

7. The method of claim 1, the method further including the steps of:

the computer determining an accuracy indicator for one or more provenance information, the computer comparing the timeline to an accepted provenance information;

the computer searching for inconsistencies between the timeline and the accepted provenance information; and the computer generating a second result that is based, at least in part, on one or both of an identified inconsistency between the timeline and the accepted provenance information, and the accuracy indicator for one or more provenance information.

8. A computer program product for generating a provenance for a physical object, the computer program product comprising:

one or more computer-readable storage media and program instructions stored on the one or more computer-readable storage media, the program instructions comprising:

program instructions to identify a first source of information that includes unstructured text and one or more keywords associated with an object;

program instructions to retrieve the unstructured text included in the first source;

program instructions to identify provenance information of the object that is included in one or more segments of the unstructured text, wherein the identified provenance information is verified;

program instructions to add the identified provenance information of the object to a timeline;

program instructions to receive a purported provenance information;

program instruction to determine a degree of accuracy of the purported provenance information using a statistical analysis based, at least in part, on a number of occurrences of the purported provenance information in the identified provenance information and a source of the purported provenance information, wherein the source of the purported provenance information comprises a historical context and one or more characteristics of a seller of the physical object; and in response to determining the degree of accuracy, program instructions to generate a report, wherein the report compares the purported provenance information to the identified provenance information, and wherein the report comprises (i) the degree of accuracy of the purported provenance information and (ii) an overlap between the purported provenance information and the identified provenance information.

9. The computer program product of claim 8, wherein the provenance information includes at least one of a temporal characteristic, a location characteristic, an ownership characteristic, an action characteristic, or a fact about an event that affected the provenance of the object.

10. The computer program product of claim 8, wherein program instructions to identify provenance information of the object that is included in one or more segments of the unstructured text includes:

program instructions to perform text analytics on the unstructured text using a dictionary and a set of rules, wherein the set of rules includes rules to retrieve unstructured text, parse the retrieved text, and extract provenance information from the parsed text, and wherein the dictionary includes a set of keywords that indicate a relationship of an object to a location, and a set of words that indicates the relationship of an object to a time.

11. The computer program product of claim 8, wherein the program instructions to add the provenance information of the object to a timeline include:

program instructions to determine a relationship between the provenance information and one or more information included in the timeline; and program instructions to add the provenance information to the timeline based, at least in part, on the identified relationship between the provenance information and one or more information included in the timeline.

12. The computer program product of claim 8, the program instructions further including:

program instructions to search for a second source of information based, at least in part, on a segment of the unstructured text included in the first source;

program instructions to retrieve information included in an identified second source;

program instructions to identify a detail in the second source that relates to the provenance information included in the first source;

program instructions to determine a relationship between the provenance information and the detail; and program instructions to add the detail to the timeline based, at least in part, on the identified relationship between the provenance information and the detail.

13. The computer program product of claim 12, wherein the detail relating to the provenance information included in the first source includes a fact about an event that affected the provenance of the object.

14. The computer program product of claim 8, the program instructions further including:

program instructions to determine an accuracy indicator for one or more provenance information, program instructions to compare the timeline to an accepted provenance information;

program instructions to search for inconsistencies between the timeline and the accepted provenance information; and program instructions to generate a second result that is based, at least in part, on one or both of an identified inconsistency between the timeline and the accepted provenance information, and the accuracy indicator for one or more provenance information.

15. A computer system for generating a provenance for a physical object, the computer system comprising:

one or more computer processors;

one or more computer readable storage media;

program instructions stored on the computer readable storage media for execution by at least one of the one or more processors, the program instructions comprising:

program instructions to identify a first source of information that includes unstructured text and one or more keywords associated with an object;

program instructions to retrieve the unstructured text included in the first source;

program instructions to identify provenance information of the object that is included in one or more segments of the unstructured text, wherein the identified provenance information is verified;

program instructions to add the identified provenance information of the object to a timeline;

program instructions to receive a purported provenance information;

program instruction to determine a degree of accuracy of the purported provenance information using a statistical analysis based, at least in part, on a number of occurrences of the purported provenance information in the identified provenance information and a source of the purported provenance information, wherein the source of the purported provenance information comprises a historical context and one or more characteristics of a seller of the physical object; and in response to determining the degree of accuracy, program instructions to generate a report, wherein the report compares the purported provenance information to the identified provenance information, and wherein the report comprises (i) the degree of accuracy of the purported provenance information and (ii) an overlap between the purported provenance information and the identified provenance information.

16. The computer system of claim 15, wherein the provenance information includes at least one of a temporal characteristic, a location characteristic, an ownership characteristic, an action characteristic, or a fact about an event that affected the provenance of the object.

17. The computer program product of claim 15, wherein program instructions to identify provenance information of the object that is included in one or more segments of the unstructured text includes:

program instructions to perform text analytics on the unstructured text using a dictionary and a set of rules, wherein the set of rules includes rules to retrieve unstructured text, parse the retrieved text, and extract provenance information from the parsed text, and wherein the dictionary includes a set of keywords that indicate a relationship of an object to a location, and a set of words that indicates the relationship of an object to a time.

18. The computer program product of claim 15, wherein the program instructions to add the provenance information of the object to a timeline include:

program instructions to determine a relationship between the provenance information and one or more information included in the timeline; and program instructions to add the provenance information to the timeline based, at least in part, on the identified relationship between the provenance information and one or more information included in the timeline.

19. The computer program product of claim 15, the program instructions further including:

program instructions to search for a second source of information based, at least in part, on a segment of the unstructured text included in the first source;

program instructions to retrieve information included in an identified second source;

program instructions to identify a detail in the second source that relates to the provenance information included in the first source, wherein the detail includes a fact about an event that affected the provenance of the object;

program instructions to determine a relationship between the provenance information and the detail; and program instructions to add the detail to the timeline based, at least in part, on the identified relationship between the provenance information and the detail.

20. The computer program product of claim 15, the program instructions further including:

program instructions to determine an accuracy indicator for one or more provenance information, program instructions to compare the timeline to an accepted provenance information;

program instructions to search for inconsistencies between the timeline and the accepted provenance information; and program instructions to generate a second result that is based, at least in part, on one or both of an identified inconsistency between the timeline and the accepted provenance information, and the accuracy indicator for one or more provenance information.

* * * * *